United States Patent Office 3,396,521
Patented Aug. 13, 1968

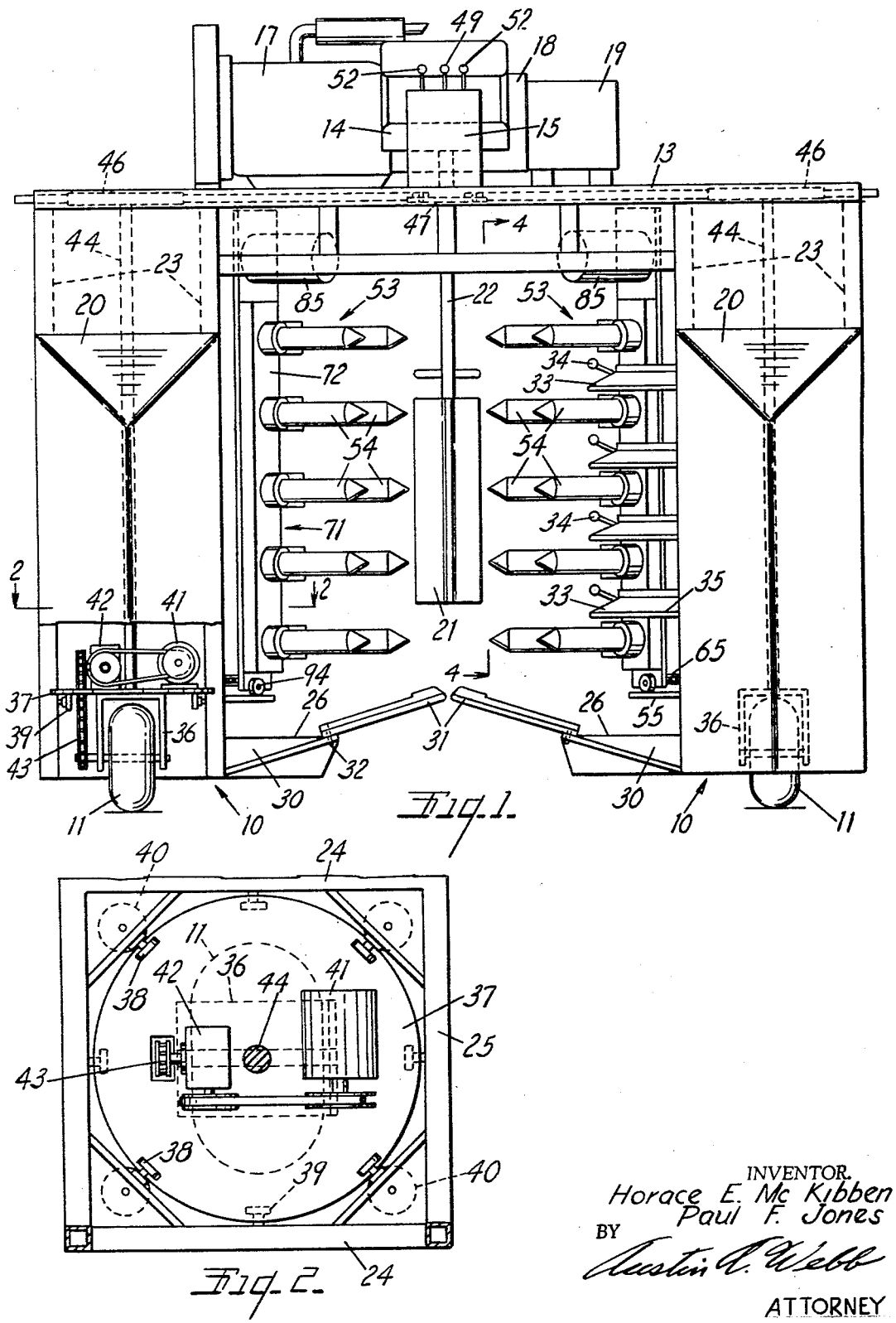

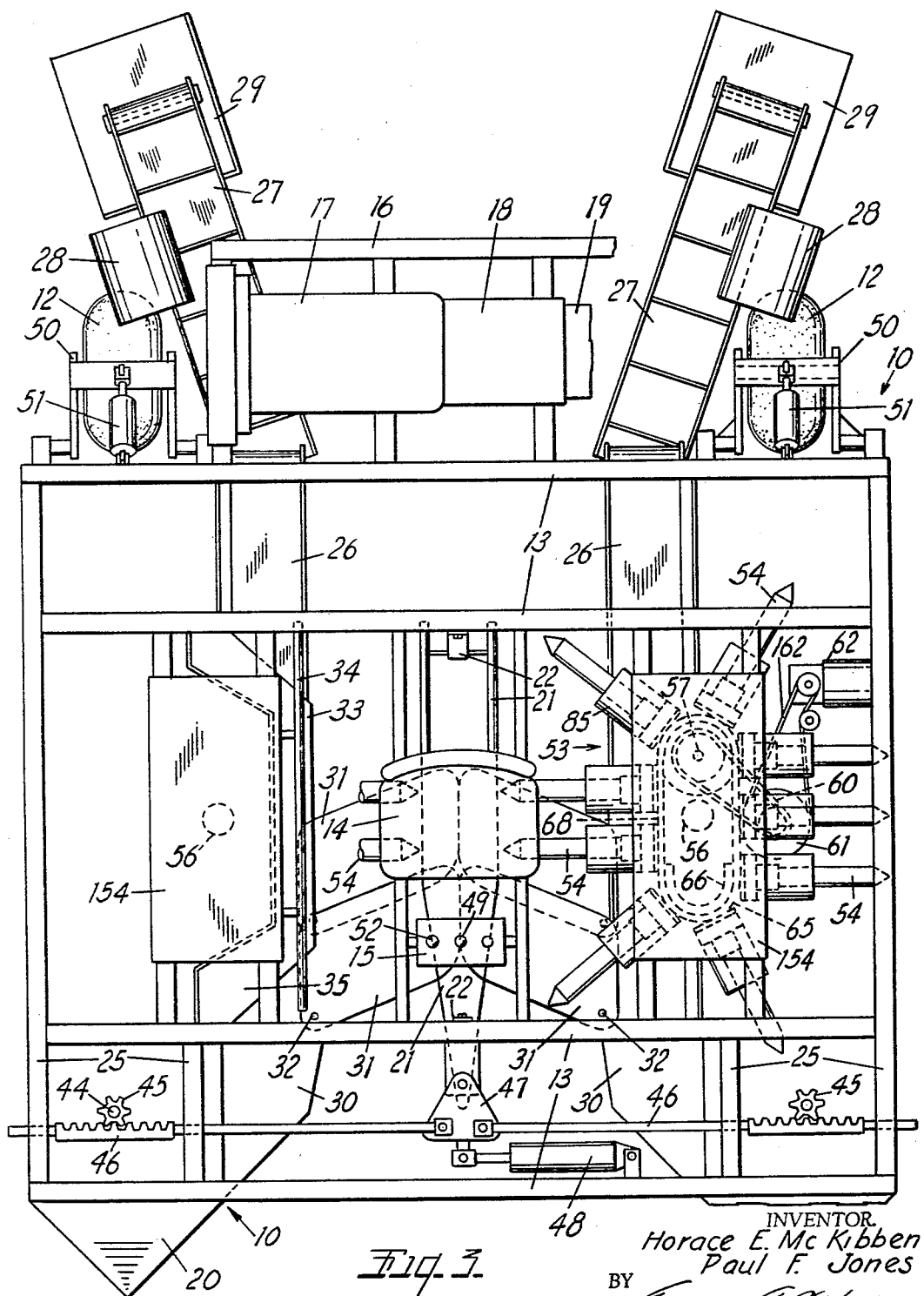

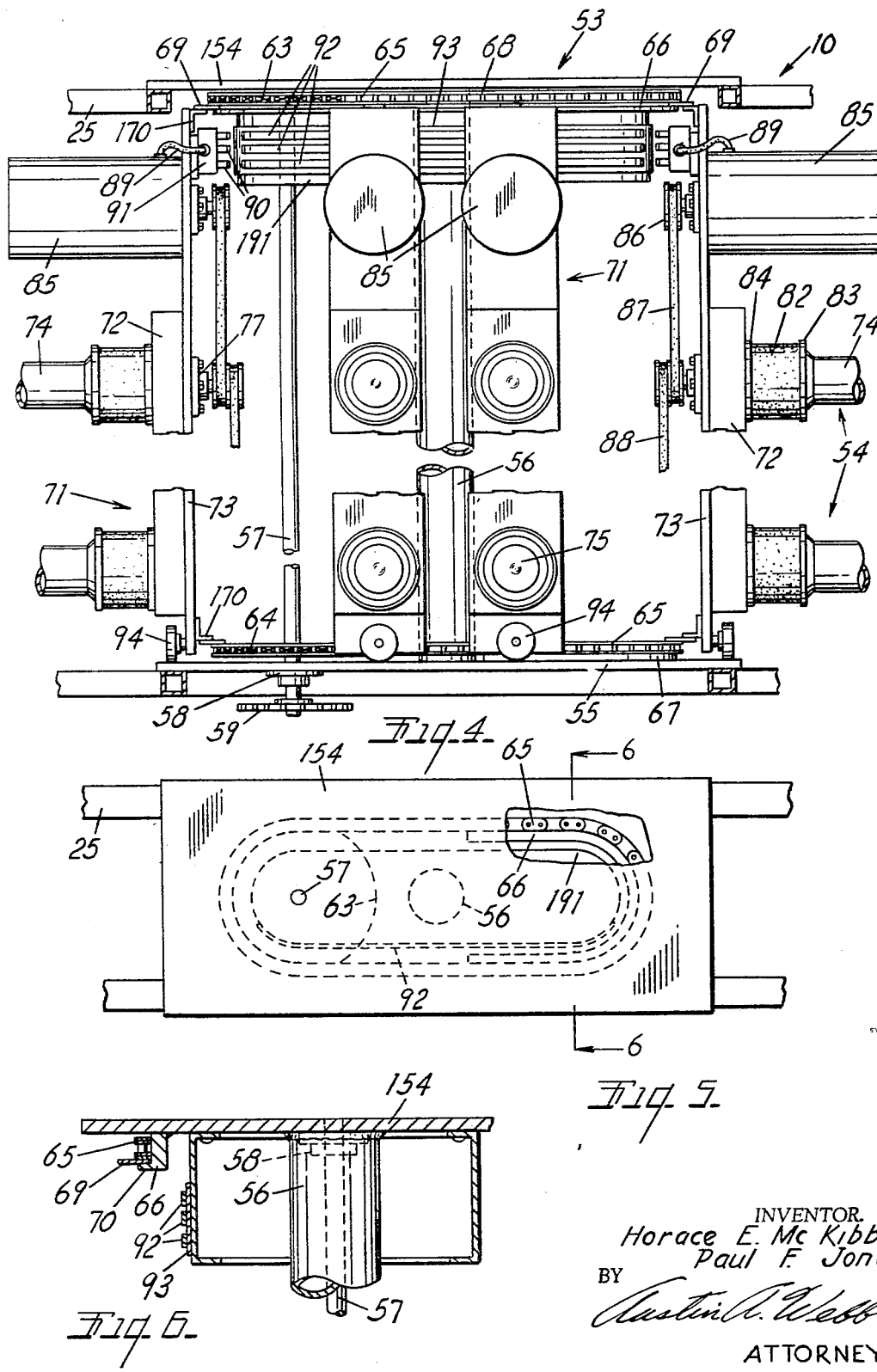

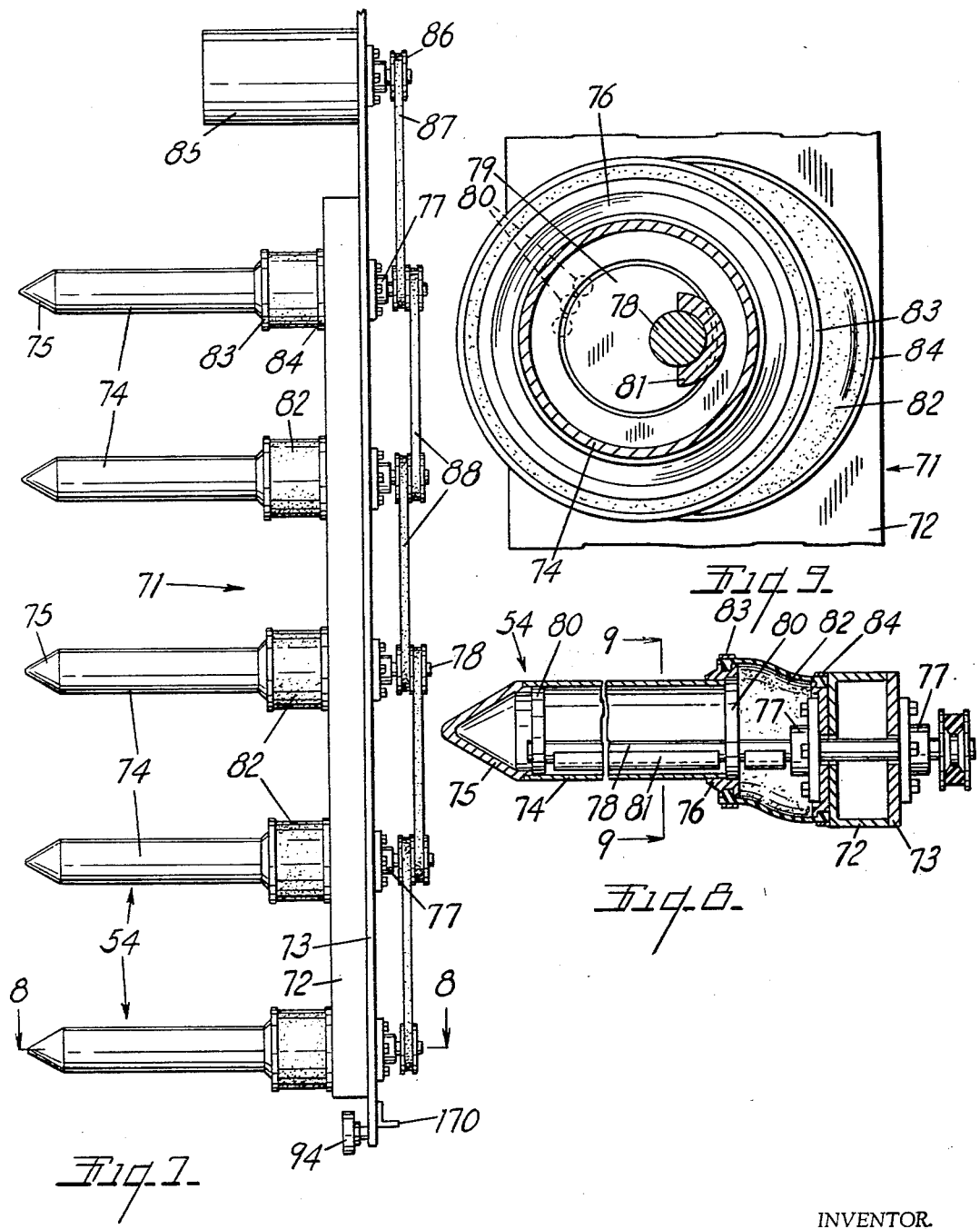

3,396,521
HARVESTING MACHINE FOR ROW CROPS SUCH AS BLUEBERRIES
Horace E. McKibben, Grand Junction, and Paul F. Jones, Dowagiac, Mich., assignors to Blueberry Equipment, Inc., South Haven, Mich.
Filed Oct. 23, 1965, Ser. No. 503,041
9 Claims. (Cl. 56—330)

This invention relates to improvements in harvesting machine for row crops such as blueberries.

Machines for harvesting row crops by means of shaking the plants or bushes on which the crops grow are old and relatively well known. Such old machines have provided upright rotating cylinders with shaker bars projecting therefrom. The machine advances along a row and the cylinders rotate so that successive shaker bars penetrate the bush or plant and remain relatively stationary in the bush with reference to the forward motion of the machine. Baffles, deflectors and conveyors have been provided on the machines to collect crop elements, such as berries that are shaken off the bushes, and convey the crop to a delivery point where it is collected in boxes or baskets.

The invention disclosed herein provides a more efficient vibratory shaking action on the plant or bush to effectively harvest more of the ripe crop without injury to the plant or bush, and with less displacement of unripened crop elements or berries so that the same may be left on the bush for later harvest. To this end the principal objects of this invention are:

First, to provide a row crop harvesting machine with vibratory fingers on arms that move uniformly throughout their length so that all portions of the bush or plant contacted by the arms are shaken at the same amplitude and frequency for uniform harvesting action throughout the bush.

Second, to provide a vibratory harvesting machine in which the shaker arms remain in the plant or bush for a longer time, relative to advancing motion of the machine, so that the vibratory motion or action of the arm may be less violent to assure complete harvest of ripe crop elements without dislodging green or partially ripened crop elements.

Third, to provide a harvesting machine of the type described in which the transverse penetrating motion of the vibratory shaker arms into the plant or bush has a gathering action on the branches of the plant or bush to hold and shake a group of branches between successive longitudinally displaced arms for more effective shaking action and a resultant reduction in the violence of the shaking motion.

Other objects and advantages of the invention will be apparent from the following description and claims. The drawings, of which there are four sheets, show a highly practical and preferred form of a harvesting machine embodying the principles of the invention.

FIGURE 1 is a front elevational view of the machine with part of the casing broken away to show the front wheel drive.

FIGURE 2 is a fragmentary horizontal cross sectional view taken along the plane of the line 2—2 in FIGURE 1.

FIGURE 3 is a top plan view of the machine with some parts omitted.

FIGURE 4 is a fragmentary inside elevational view of the vibrator or shaker mechanism on one side of the machine as viewed from the plane of the line 4—4 in FIGURE 1.

FIGURE 5 is a fragmentary top plan view of the support and drive for the vibrator advancing mechanism with parts broken away and omitted.

FIGURE 6 is a fragmentary vertical cross sectional view through the guide and drive for the top of the vibrator advancing mechanism, taken along the plane of the line 6—6 in FIG. 5, again with parts omitted.

FIGURE 7 is an enlarged side elevational view of one of the vibrator carriers and the vibrator or shaker arms carried thereby.

FIGURE 8 is an enlarged fragmentary cross sectional view through one of the vibrator or shaker arms taken along the plane of the line 8—8 in FIG. 7.

FIGURE 9 is a still further enlarged fragmentary transverse cross-sectional view through one of the shaker arms taken along the plane of the line 9—9 in FIG. 8.

The machine of the invention consists of a pair of transversely spaced side members indicated generally at 10 and mounted on driving and steerable front wheels 11 and yieldably supported at the back by trailing wheels 12. The two side members are connected in transversely spaced relation by suitable top cross frame elements indicated collectively at 13. The top frame 13 supports a drivers seat 14 with a control box or column 15 in front of the seat. A rear extension 16 of the top frame supports an internal combustion engine 17 connected to drive an electric generator 18 and a hydraulic pump 19. The fronts of the side frames have forwardly projecting, V-shaped plow elements 20 suitably covered with sheet metal and a central bush divider 21 is suspended from the center of the top cross frame 13 by hanger bars 22.

The side frames 10 have upright structural columns or bars 23 connected by cross bars 24 and longitudinal elements or bars 25. The bottoms of the side frames support horizontal conveyors 26 along their inner sides that deliver rearwardly to divergent loading conveyors 27. Blowers 28 positioned over the loading conveyors blow leaves and twigs out of the berries or crop being harvested. The conveyors 27 deliver to a place over platform 29 which is adapted to support receiving boxes or baskets. Upwardly inclined plows or baffles 30 at the fronts of the horizontal conveyors lift low branches of the bushes or plants from which the crop is being harvested. A series of bottom collector plates or baffles 31 are pivotally mounted at 32 along the inner sides of the horizontal conveyors and arranged in successively rearwardly overlapping relation so that the collector plates may swing apart by contact with the trunk or base of bushes being harvested to clear the bushes, while maintaining transversely outwardly inclined surfaces to direct falling berries to the horizontal conveyors.

The inner, opposed, sides of the side members 10 support vertically spaced and downwardly and inwardly inclined baffles 33 that both support the branches of bushes and direct falling berries inwardly. Bush or branch divider bars 34 supported on the side baffles further divide and vertically support the branches of the bushes. The forward ends of the baffles 33 are laterally outwardly divergent as appears at 35 in FIGS. 1 and 3 to collect or draw the branches inwardly on opposite sides of the center divider 21. It is pointed out that the side baffles 33 are omitted from the left side of FIGURE 1 to better illustrate the shaker mechanism to be described. Similarly, the shaker arms are omitted in the left side of FIG. 3 to better illustrate the baffles.

The front wheels 11 are mounted on yokes 36 secured to round plates 37 (see FIG. 2) and the plates are vertically supported and located between upper rollers 38 and lower rollers 39 mounted on the frame elements 24 and 25. Radial locating rollers 40 locate the peripheries of the wheel supporting plates. An electric motor 41 mounted on the circular plate is selectively energized from the generator 18 and drives a speed reducer 42 from which the chain 43 drives the wheel. A steering shaft 44 extends up from each plate 37 to a pinion 45. (See FIG. 3.) The pinions are rotated for steering motion by movement of rack bars 46 connected to a bell crank 47 pivoted near the center of the top cross frame 13. A hydraulic cylinder 48 deriving pressure from the pump 19 through one of the controls 49 on the control column effects the steering of the machine. Details of the hydraulic connections and controls are not illustrated.

The rear wheels 12 are mounted on vertically swingable yokes 50 and are selectively positioned at different levels by hydraulic cylinders 51 under the control of controls 52 to keep the machine level.

All of the foregoing supporting and transporting mechanism can be varied in many respects and so is not described in greater detail. Taken collectively it provides a steerable carriage for the support of shaker mechanism of the invention. The shaker mechanism indicated generally at 53 is duplicated on each side frame 10 and a description of one will suffice, except to note in FIGURES 1 and 3 that each shaker assembly has a multiplicity of pointed shaker arms 54 that are advanced into inwardly projecting, closely spaced relation relative to the opposite side of the center divider 21 and translated rearwardly therealong as will be described.

As appears more clearly in FIGURES 4, 5 and 6, the longitudinal frame members 25 support upper plates 154 and lower plates 55 intermediate the front and rear ends of the upright side frames. An upright post or column 56 further locates the plates and holds them in parallel spaced relation. A drive shaft 57 journalled in bearings 58 projects through the bottom plate to a sprocket 59. This is driven by a chain 60 (see FIG. 3) from a speed reducing sprocket and pulley 61 mounted on the frame below the lower plate 55. A motor and gear box 62 driving through the belt 162 drives the pulley and sprocket 61.

The shaft 57 carries and drives an upper sprocket 63 and a lower sprocket 64 mounted adjacent the opposed surfaces of the plates 154 and 55 respectively. The sprockets drive chain loops 65 in circuitous paths, directed in part, around U-shaped guide tracks 66 at the top and 67 at the bottom. This leads the chain loops from transversely inwardly moving portions at the front to parallel rearwardly extending reaches 68 along the inner sides of the upright side frames 1.

The chain loops 65 each have outwardly projecting lugs or ears 69 which ride on flanges 70 of the U-shaped guides, and which are connected to angle brackets 170 mounted on the tops and bottoms of a series of upright carriers indicated generally at 71. Each carrier 71 consists of a channel member 72 opening inwardly of the chain loops 66 and 67. A rear or inner plate 73 is attached across the open side of the channel and projects from the ends thereof to the supporting brackets 70. Each shaker arm 54 is a light weight aluminum tube 74 having a pointed outer end cap 75 and an enlarged mounting ring 76 on its inner end. Bearings 77 mounted on the channel and backing plate support a shaft 78 that projects into the tube. Eccentric discs 79 on the shaft turn in bearings 80 that are in turn seated within the tube 74 to orbitally oscillate the tube. Counter weights 81 on the shaft counter-balance the inertia forces of the eccentrically oscillating tube. A flexible sleeve 82 clamped to the tube at 83 and to the channel at 84 prevents rotation of the tube about its axis while permitting the orbital oscillation.

The several shafts of the shaker arms 54 on each carrier 71 are driven at high speed by electric motors 85 mounted on the upper ends of the plates 73. The motors have shafts with pulleys 86 driving belts 87 to the top shaker arms shaft and each shaker arm shaft is belt connected at 88 to the next lower shaft on the carrier so that all shaker arms oscillate in unison.

The motors 85 are three phase motors and are energized through cables 89 to sliding commutator brushes 90 carried by boxes 91 secured to the tops of the plates 73. The brushes 90 slide along an oval shaped contact support plate 191 secured to the bottom of the upper plate 154 on the side frame 1. Electrically conducting contact strips 92 are mounted on insulation 93 along the inwardly and rearwardly extending portions of the circuitous path of the carriers and the shaker arms. The contact strips terminate along the curved ends of the oval support plate and are omitted along the outer, forwardly advancing portion of the path of the carriers so that the motors 85 and the shaker arms are driven only while the shaker arms are being moved into and out of the bush, and while the arms are in the bush. The shaker arms project and are advanced, rearwardly relative to the carriage, between the baffle plates 33 and branch support bars 34. The arms are thus vibrated or oscillated during only about one half of the circuit of the carriers to save power and reduce the vibratory wear on the shafts 77 and bearings 78. The carriers 71 are supported in part by rollers 94 mounted on the bottoms of the plates 73 and rolling on the plate 55.

In operation, the forward motion of the carriage by the drive wheels 11 is adjusted to be equal and opposite to the rearward motion of the shaker arms 54 so that the arms are relatively stationary with respect to the bush or plant within which they are being oscillated. With particular reference to the right side of FIG. 3, it will be noted that each successive shaker arm 54 is moved transversely into the bush and remains relatively stationary therein as the carriage advances along the row. As the arms swing radially into the bush, they overtake and become parallel to the preceding shaker arms. This creates or performs a gathering action on the branches of the bush to engage and hold the branches between the rearwardly moving shaker arms.

The branches of the bushes, being gathered transversely by the baffles 33 and bars 34, and being gathered longitudinally of the machine by the swinging motion of the shaker arms, are assured maximum contact between the surfaces of the shaker arms and the relatively stationary baffles 33 and bars 34. The shaker arms oscillate at the same amplitude and frequency throughout their length. This results in a uniform and well distributed vibrating or shaking action of substantially all of the branches. The shaker arms 54 can thus be driven with the minimum of agitation necessary to shake off ripe crop elements or berries. No part of the branches is shaken with greater violence than the rest, and berries that are not yet ripe (and more firmly connected to the branches) are disturbed only at a minimum. Thus the unripe crop remains on the bush or plant to ripen naturally, and it is possible to harvest from the same bushes or plants several times during the growing season. The resultant economic advantages of a larger ripe crop, spread over a longer period, are obvious. Also the use of the minimum agitation of the bushes results in less physical damage and strain on the bushes.

What is claimed as new is:

1. A harvesting machine for row crops such as blueberries having a driven and steerable carriage with upright side frames connected by raised cross members and adapted to straddle a crop row and having bush shaking means mounted in said side frames characterized by, a series of upright carriers movably mounted in said side frames, means connected to said carriers to move each series in a circuit path with the adjacent opposed inner reaches of each series moving from a forwardly convex path to rearwardly moving generally parallel reaches relative to said carriage, a plurality of shaker arms mounted on each of said carriers in vertically spaced relation and in outwardly projecting relation relative to said circuit paths, means mounted on said carriers and connected to said arms to move said arms bodily in eccentric orbital paths parallel to their individual longitudinal axes, first drive means connected to actuate said means for moving said carriers, second drive means connected to actuate said means for moving said arms, baffle means carried by said side frames in position to direct crop elements shaken from the crop rows downwardly along the insides of said side frames, and conveyor means positioned to receive crop elements from said baffle means and driven to discharge the crop elements to a delivery point on said machine.

2. A harvesting machine as defined in claim 1 in which said means for orbitally moving said arms include drive shafts rotatably mounted on said carriers, eccentrics carried by said drive shafts and engaged with said arms at the ends of the arms, and counterweights on said shafts opposing the orbital inertia of said arms and said eccentrics.

3. A harvesting machine as defined in claim 2 in which said eccentrics are rollingly engaged with said arms, and annular flexible sleeves fixedly connected at one end to said carriers and at the other end to the inner ends of said arms around said shafts.

4. A harvesting machine as defined in claim 2 in which each of said carriers has a motor mounted thereon and connected to each of the drive shafts on the carrier as the second drive means to oscillate the arms.

5. A harvesting machine as defined in claim 4 in which said motors on said carriers have sliding brush connections to energizing conductors located adjacent the path of said carriers, said energizing conductors being engageable with said brush connectors only along the rearwardly moving inner reaches of the paths of said carriers.

6. A harvesting machine as defined in claim 5 in which said means for moving said series of connectors include driven sprockets located adjacent the ends of the carriers, chain loops trained around said sprockets and connected to said carriers, and U-shaped guides guiding said loops in generally oval paths disposed longitudinally of said side frames.

7. A harvesting machine as defined in claim 2 in which there is a vertical bush divider suspended from said cross members and in which the outer ends of said arms are translated in closely spaced relation to opposite sides of said divider.

8. A harvesting machine as defined in claim 6 in which there is a vertical bush divider suspended from said cross members and in which the outer ends of said arms are translated in closely spaced relation to opposite sides of said divider.

9. A harvesting machine as defined in claim 3 in which said arms are tubular with closed and pointed outer ends, and circular bearings relatively rotatably positioned between the eccentrics on said drive shafts and the insides of said tubular arms.

References Cited

UNITED STATES PATENTS

| | | | |
|---|---|---|---|
| 992,960 | 5/1911 | Haring | 56—42 |
| 1,176,891 | 3/1916 | Haring | 56—42 |
| 3,107,471 | 10/1963 | Lindsay | 56—42 |
| 3,184,908 | 5/1965 | Rust | 56—330 |
| 3,245,211 | 4/1966 | Weygandt et al. | 56—330 |
| 3,255,578 | 6/1966 | Pertics | 56—330 |
| 3,276,194 | 10/1966 | Mohn et al. | 56—330 |
| 3,282,036 | 11/1966 | Paulson et al. | 56—19 |
| 3,323,296 | 6/1967 | Starkey | 56—42 |
| 3,325,984 | 6/1967 | Christie | 56—330 |

ALDRICH F. MEDBERY, *Primary Examiner.*